Dec. 27, 1955        N. O. SMITH-PETERSEN        2,728,549
VALVES
Filed May 24, 1952        3 Sheets-Sheet 1

INVENTOR.
Nils O. Smith-Petersen.
BY
Albert J. Henderson
HIS ATTORNEY

Dec. 27, 1955  N. O. SMITH-PETERSEN  2,728,549
VALVES

Filed May 24, 1952  3 Sheets-Sheet 2

INVENTOR.
Nils O. Smith-Petersen.
BY
Albert J. Henderson
HIS ATTORNEY

Dec. 27, 1955  N. O. SMITH-PETERSEN  2,728,549
VALVES
Filed May 24, 1952  3 Sheets-Sheet 3
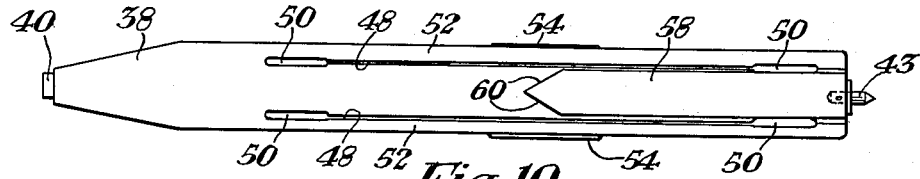
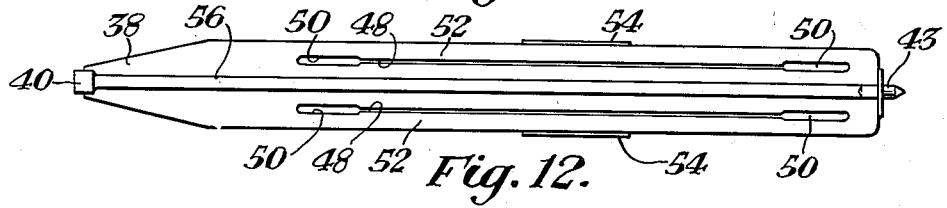
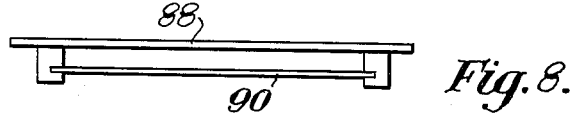
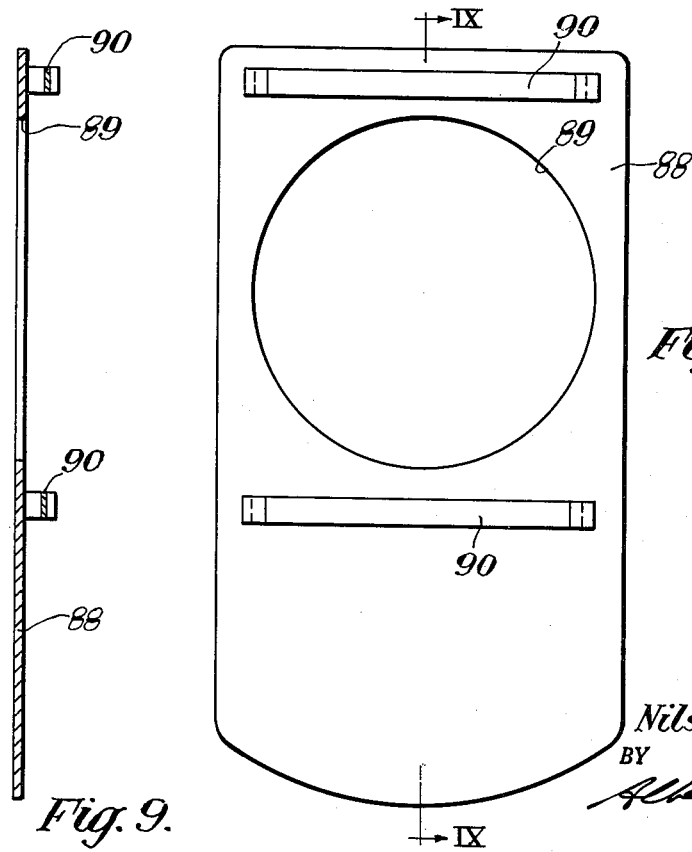
INVENTOR.
Nils O. Smith-Petersen.
BY
Albert J. Henderson
HIS ATTORNEY

United States Patent Office 2,728,549
Patented Dec. 27, 1955

2,728,549

VALVES

Nils O. Smith-Petersen, Yonkers, N. Y., assignor to Walworth Company, Boston, Mass., a corporation of Massachusetts Application May 24, 1952, Serial No. 289,715

6 Claims. (Cl. 251—196)

This invention relates to valves and more particularly to double disc conduit gate valves.

Valves of the described nature have heretofore been subject to various disadvantages including a tendency to lock the closure member between the valve seats. Necessarily, a wedging action is required to force the disc elements of the closure member tightly against their respective seats, but this action should not interfere with normal operation of the valve. Valve discs are often constructed with inner inclined surfaces which slide relatively to each other when the movement of one disc upwardly or downwardly is arrested by stops so located as to produce a wedging action when the closure member is in open or closed position. However, the fluid pressure may cause a friction force on the downstream side between one disc and its seat of sufficient magnitude to arrest the movement of that disc. A wedging action thereby occurs and forces both discs against the seats in a position intermediate the normal opened or closed positions with a tendency toward locking the discs in such position.

Attempts to overcome this locking tendency have produced the so-called one-way valve. Thus, if the valve is given a definite or preferred position with regard to flow direction of the fluid, then the tendency toward locking is diminished. However, the direction of the fluid flow cannot then be reversed in such a valve without increasing the locking tendency so that the use of the valve is limited to operations where no reversal of fluid flow occurs. Springs and other devices are used to keep the discs away from the seats in intermediate valve positions, but the fluid pressure often overcomes such devices. Moreover, such spacing of the discs and seats permits foreign and abrasive substances to lodge in the contact areas with disastrous consequences to the desired tight sealing conditions.

Another objectionable feature of the inclined disc faces is that the wedge angle becomes small as the length of the discs increases. The locking effect of small wedge angles is well known and may be such as to render the valve inoperative. On the other hand, elongated contact surfaces are difficult to produce without expensive operations. If the same are not precise, then only spot contact will occur with consequent surface galling and a possible seizure between the parts.

The valves should not be limited for use only in horizontal or substantially horizontal pipe lines. In existing conduit valves, this limitation is imposed due to the nature of the wedging areas for if such valves are used in vertical or almost vertical pipe lines, the weight of the discs will alter the action of the forces on the wedge surfaces and will thus alter the wedging action itself. This leads to further locking difficulties as will be apparent.

The present invention seeks to overcome the difficulties heretofore apparent in conduit gate valves by providing a generally improved construction without complicated parts or involved assembly operations. To this end, a pair of elongated guide members are permanently mounted on opposite sides of the valve casing intermediate the seating means. The guide members are formed of a resilient material and each is longitudinally slotted over its medial portion. Laterally extending bearing means carried by each guide member are positioned for operative engagement with the valve discs at all times for maintaining the discs in yieldable engagement with the seats in all positions of the valve discs.

Wedging means are carried by each guide member and located axially of the flow passages. The valve discs are movable relative to the guide members between open and closed positions and carry wedging means for cooperation with the wedging means on the guide members in the closed position of the discs, such cooperation being effective to apply lateral forces to the discs to hold the same in tight seating engagement with the seating means.

An object of this invention is to simplify the construction for eliminating any possibility of locking action on the discs except when the valve is fully closed.

Another object of this invention is to simplify the construction for making the desired wedging action take place only opposite the seats in the valve body.

Another object of this invention is to incorporate, in a single guide element, sufficient stationary and permanent spring forces for pressing the valve discs against the seat rings thereby insuring full disc-to-seat contact at all times and in all positions of the valve, including locations of the valve in vertical and inclined pipe lines.

Another object of this invention is to reduce to a minimum the number of parts required to produce forces directed axially of the valve seat and acting on the valve discs in all positions thereof to hold the same in engagement with the valve seats.

Other objects and advantages will become apparent from the following description taken in connection with the accompanying drawings wherein:

Fig. 7 is a front elevation on an enlarged scale of a shield element adapted for use in a valve embodying this invention;

Fig. 8 is a plan view of the element shown in Fig. 7;

Fig. 9 is a longitudinal sectional view taken on the line IX—IX of Fig. 7;

Fig. 10 is a front elevation on an enlarged scale of one of the guide members of this invention;

Fig. 11 is a side elevation of the member shown in Fig. 10; and

Fig. 12 is a rear elevation of the guide member shown in Fig. 10.

Figure 1:
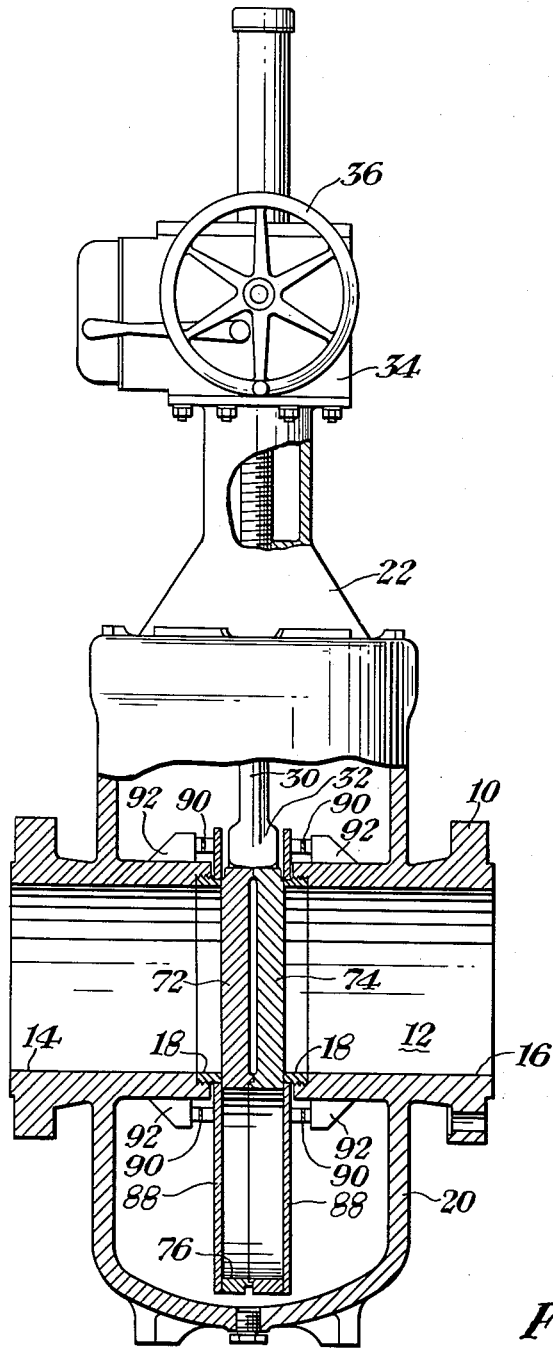
Fig. 1 is a front elevation, partly in section, of a conduit gate valve embodying this invention.
Figure 2:
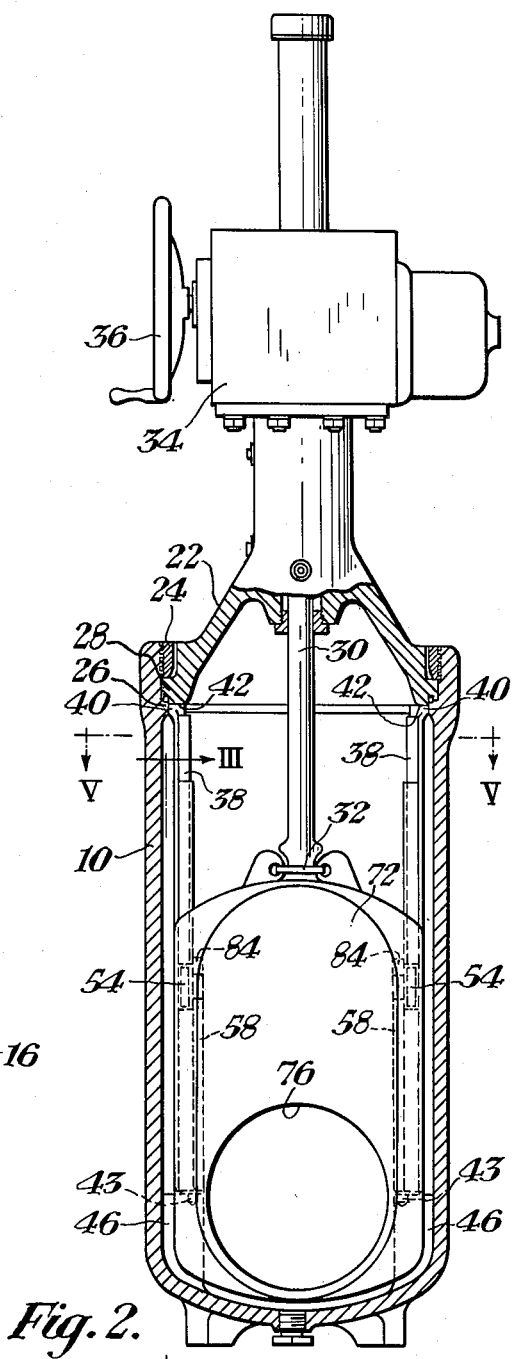
Fig. 2 is a side elevation, partly in section, of the valve shown in Fig. 1.

Referring more particularly to Figs. 1 and 2 of the drawings, the conduit gate valve is shown as comprising a valve body 10 having a fluid passageway 12 extending therethrough and terminating at opposite ends in inlet and outlet passages 14 and 16 respectively. It will be understood that in accordance with the principles of this invention the inlet and outlet passages 14 and 16 may be reversed if desired. The fluid passageway 12 is intersected by the usual valve chamber having a pair of oppositely disposed parallel seating means provided by threaded seat rings 18 which extend into the valve chamber. A lower chamber 20 is formed on the valve body 10 beyond the seating means and the usual bonnet 22 projects from the body 10 opposite the chamber 20. The bonnet 22 is shown as secured to the body 10 by a self sealing arrangement, including a threaded ring member 24 which serves to secure cooperating flanges 26 and 28, formed on the body and bonnet respectively, in sealing engagement.

The gate valve of this embodiment is of the rising stem type and is provided with a valve stem 30 which is journaled for axial movement in the bonnet 22 and provided with the usual stem collar or head 32 at its inner end. The valve may be adapted for power operation by the provision of a power unit 34 which is mounted on the bonnet 22 and suitably geared to the valve stem 30. A hand wheel 36 may be incorporated in the power unit 34 for manual operation of the valve when desired. As the structure of the power unit forms no part of the present invention, further description thereof is deemed unnecessary.

As shown more clearly in assembled relation in Fig. 2, a pair of elongated guide members 38, are mounted on opposite sides of the valve body 10 intermediate the seat rings 18. These guide members 38 are identical in all respects and one is shown in detail in Figs. 10-12 inclusive. Thus, each guide 38 includes a projection 40 at one end which engages a suitable recess 42 formed in the bonnet 22 adjacent the flange 28. The opposite end of the guide member 38 is also provided with a projection 43 which engages a suitable recess formed in a lug 46 projecting from the wall of the chamber 20 for this purpose. It should be observed that the terminal ends of each guide member 38 carrying the lugs 40 and 43 are formed to engage the adjacent walls of the bonnet 22 and the lugs 46 respectively to provide firm seating for each guide member 38 and that the projections 40 and 43 are depended upon merely for locating purposes. Due to the construction shown and described, the guide members 38 are mounted permanently in the body 10, although removal can be effected when desired by first removing the bonnet 22 as will be apparent.

Each guide member 38 is provided with a pair of laterally spaced longitudinally extending slots 48 formed in the medial portion thereof, each slot 48 terminating at each end in an enlarged aperture 50. The slots 48 and apertures 50 thus serve to define a flexible strip 52 on each side of the guide member separate from the main body thereof while retaining the ends of the strips 52 securely anchored to the main body of the guide element 38. Bearing means, here shown as raised abutments 54, are carried on the strips 52 and extend laterally beyond the opposite outer edges thereof.

An elongated reinforcing rib 56 is preferably centrally disposed on one side of the guide member 38. On the other side of the guide member 38 is formed an elongated raised portion 58 which is disposed between the slots 48 and preferably terminates adjacent the abutments 54. One end of the raised portion 58 is provided with oppositely disposed inclined surfaces 60 which together provide wedging means located axially of the fluid passageway 12 in the valve body 10. The inclined surfaces 60 may be suitably surfaced with hard material, such as Stellite, to increase the wearing qualities.

The valve closure means for the inlet and outlet passages 14 and 16 of the fluid passageway 12 comprise a pair of matching valve discs 72, 74 respectively which are of generally rectangular form. In the closed position of the valve, the valve discs 72, 74 extend beyond the seat rings 18. An aligned port 76 is formed in the extended portion of each valve disc which is housed within the chamber 20 in the closed position of the valve. In the open position of the valve, the ports 76 are aligned with the fluid passageway 12 in the body 10 and form a continuation thereof to permit unobstructed passage of fluid through the valve. The upper ends of the valve discs 72, 74 are detachably secured to the valve stem 30 by engagement of suitable slots therein with the collar 32.

Figure 6:
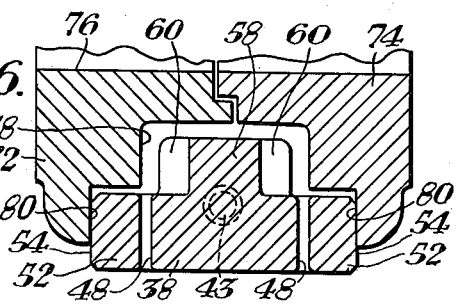
Fig. 6 is a fragmentary cross-section on an enlarged scale taken on the line VI—VI of Fig. 4.

The outer faces of the valve discs 72, 74 are substantially parallel for engagement with the seat rings 18. The outer sides of the valve discs 72, 74 which parallel the valve stem 30 are recessed adjacent their inner matching faces so that the recessed edges will be contiguous when the valve discs are assembled, the registering recesses cooperating to define a pair of longitudinal slots 78 extending on diametrically opposite sides of the seat rings 18 when the valve discs are in position in the body 10. As shown in Fig. 6, each longitudinal slot 78 forms a T-shaped recess in the cross-section of the assembled discs, these T-shaped recesses being disposed on either side of the valve discs 72, 74. The center leg portion of each T-shaped slot 78 receives the raised portion 58 of the guide member 38 while the head portion of each T-shaped slot 78 receives that portion of the guide member 38 on which are formed the strips 52.

When the valve discs 72, 74 are in engagement with the seat rings 18, the distance between the side walls 80 of the head portion of the T-shaped slots 78 is less than the distance between the outer surfaces of the abutments 54 of the guide member 38 when the guide member 38 is not assembled in the valve. Thus, upon assembly of the guide members 38 in the valve, the abutments 54 engage the side walls 80 of the T-shaped slots 78 and the strips 52 of the guide members are flexed toward each other. Such flexing of the strips 52 causes the same to exert a bias on the side walls 80 for maintaining the valve discs 72, 74 in yieldable engagement with the seat rings 18 in all positions of the valve.

Formed within the center leg portions of the slots 78 are projections 84 having inclined faces 86 for engagement with the inclined faces 60 formed on the guide members 38. Such cooperation between the wedging means on the valve discs 72, 74 and the wedging means formed on the guide member 38 serves to apply lateral forces to the valve discs 72, 74 to hold the same in tight sealing engagement with the seat rings 18 when the valve member is in closed position. This engagement is illustrated in Fig. 3 where the valve discs 72, 74 are shown in the closed position.

Figure 5:
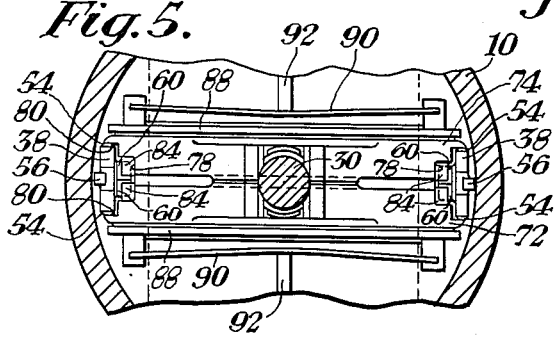
Fig. 5 is a cross-section on an enlarged scale taken on the line V—V of Fig. 2.

A pair of shielding means, comprising generally rectangular plate members 88, are provided for operative engagement with the valve discs 72, 74 respectively. The shield plates 88 are shown more clearly in Figs. 7-9 inclusive and are each provided with an aperture 89 for the reception of the projecting ends of the seat rings 18. A yieldable mounting for each of the shield plates 88 comprises a pair of bar springs 90 secured on diametrically opposite sides of the aperture 89 for operative engagement with projections 92 of the valve body 10 located on diametrically opposite sides of the passages 14 and 16 therein. It will be observed that the shield plates 88 extend over the lower ported portions of the valve discs 72, 74 in both the open and closed positions thereof for a purpose apparent hereinafter. As will be apparent from Fig. 5, the engagement of the projections 92 with the bar springs 90 tends to produce a curvature on the springs to insure that the magnitude of the bias exerted thereby is less than that exerted by the flexed strips 52 embodied in the guide members 38.

*Operation*

Figure 3:
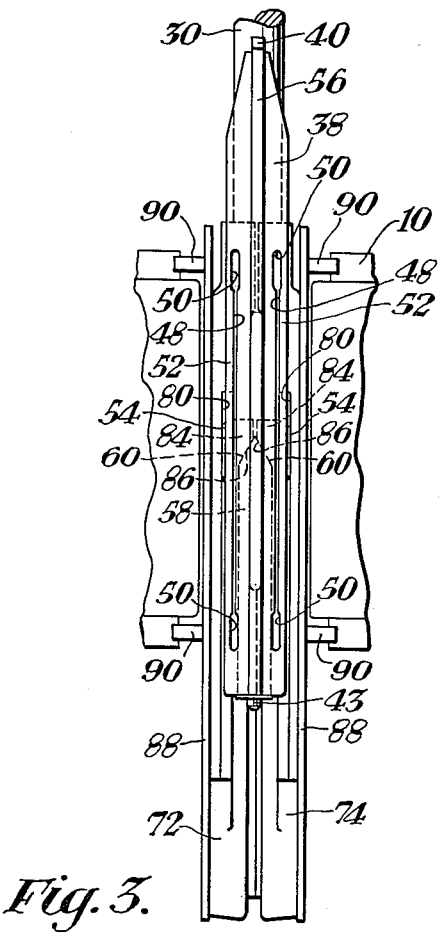
Fig. 3 is a fragmentary sectional view on an enlarged scale taken on the line III—III of Fig. 2.

The valve may be assumed to be in the closed position, shown in Figs. 1 and 3 wherein it will be observed that the inclined faces 86 formed on the valve discs 72, 74 have been brought into engagement with the inclined faces 60 formed on the guide members 38. The wedging action exerted by the coaction of the inclined faces 86, 60 is axially of the seat rings 18 and the passages 14 and 16. Since the source of this wedging action is in the guide members 38 which are permanently located in a position relative to the seat rings 18, the wedging action takes place only in the closed position of the valve discs 72, 74.

Figure 4:
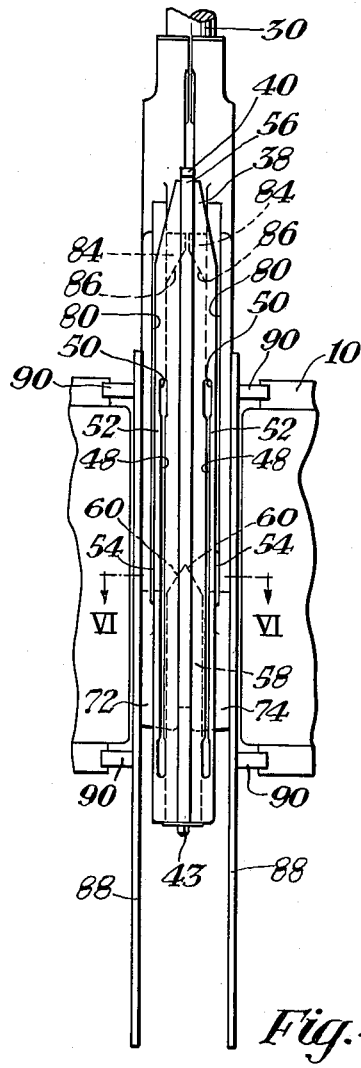
Fig. 4 is a fragmentary sectional view, corresponding to Fig. 3, but showing the parts in another position of operation.

In addition to the wedging action, sufficient stationary and permanent forces are incorporated in the guide members 38 to press the valve discs 72, 74 against the seat rings 18 thereby insuring full disc-to-seat ring contact at all times and in all positions of the valve including the closed position shown in Figs. 1 and 3 and the open position shown in Fig. 4. Such permanent spring forces are exerted by the flexed strips 52 of the guide members 38 which remain stationary while the valve discs 72, 74 move between open and closed positions. Thus, the seat ring contact areas are at no time exposed to the fluid flowing through the passageway 12 and foreign particles cannot be deposited thereon.

Moreover, the valve disc contact areas are protected by the shields 88 which project beyond the seat ring contact areas and are held against the valve discs 72, 74 by the stationary and permanent forces exerted by the bar springs 90. Since the shields extend over the ported area 76 of the valve discs 72, 74 when the valve is in the closed position shown, sediment in the disc port opening 76 cannot be discharged into the chamber 20 at any time. It is to be noted that the forces exerted by the bar springs 90 on the shield member 88 need only be sufficient to protect the disc contact surfaces against deposit of foreign matter.

Upon rotation of the valve stem 30, either by operation of the power unit 34 or the hand wheel 36, the valve stem 30 moves axially carrying with it the valve discs 72, 74. The valve is thus operated to open position as shown in Fig. 4. It will be observed, however, that the guide members 38 have remained in permanently located position relative to the valve body 10 during such operation. Consequently, the initial movement of the valve discs 72, 74 serves to separate the inclined faces 86 on the valve discs from the inclined faces 60 on the guide members 38 and the only forces tending to spread the valve discs 72, 74 apart are those applied by the flexed strips 52. These forces are sufficient to maintain the valve discs 72, 74 in engagement with the seat rings 18.

When the valve discs 72, 74 reach the full-open valve position, the ports 76 therein are aligned with the passages 14, 16 and form a continuation of the fluid passageway 12 through the valve body 10. The valve discs 72, 74 remain in contact with the seat rings 18 throughout the opening movement due to operation of the flexed strips 52 tending to spread the discs apart. Moreover, the shield plates 88 also remain in operative engagement with the valve discs 72, 74 throughout the opening movement due to the bias of the bar springs 90 thereon.

It will be apparent that in the embodiment of this invention herein shown and described, a single element of simple construction acts on each side of the closure member of the valve to bias the valve discs into engagement with the valve seats at all times and to exert a wedging action on the valve discs in the closed position thereof.

Although the disclosed embodiment of this invention has been described in considerable detail, it is to be understood that such description is intended as illustrative rather than limiting as the invention may be variously embodied and is to be interpreted as claimed.

It is claimed and desired to secure by Letters Patent:

1. A conduit gate valve comprising a casing having inlet and outlet passages and oppositely disposed seating means between said passages, closure means movable between open and closed positions relative to said seating means and including a pair of matching valve discs extending beyond said seating means and having ports forming a continuation of said passages in said open position, a pair of elongated guide elements carried by said casing and disposed on opposite sides of said casing intermediate said seating means, each of said elements being longitudinally slotted over a medial portion thereof to impart flexibility thereto, and bearing means carried on each of said elements and disposed longitudinally thereof within said medial portion, said bearing means extending laterally beyond at least one edge of each of said elements for engagement with at least one of said valve discs to flex said medial portions and bias said last named valve disc into engagement with said seating means in all positions of said discs.

2. A conduit gate valve comprising a casing having inlet and outlet passages and oppositely disposed seating means between said passages, closure means movable between open and closed positions relative to said seating means and including a pair of matching valve discs extending beyond said seating means and having ports forming a continuation of said passages in said open position, a pair of elongated guide elements carried by said casing and disposed on opposite sides of said casing intermediate said seating means, each of said elements having at least one longitudinally extending slot formed in the medial portion thereof to impart flexibility thereto, a pair of bearings on opposite sides of each of said elements and disposed longitudinally thereof within said medial portion, said bearings extending laterally beyond the edges of each said element for engagement with said valve discs respectively to flex said medial portions and bias said valve discs into engagement with said seating means in all positions of said discs.

3. A conduit gate valve comprising a casing having inlet and outlet passages and oppositely disposed seating means between said passages, closure means movable between open and closed positions relative to said seating means and including a pair of matching valve discs extending beyond said seating means and having ports forming a continuation of said passages in said open position, a pair of elongated guide elements carried by said casing and disposed on opposite sides of said casing intermediate said seating means, each of said elements having a pair of laterally spaced longitudinally extending slots formed in a medial portion thereof to impart flexibility thereto, and a pair of bearings on opposite sides of each of said elements and disposed longitudinally thereof within said medial portion, said bearings extending laterally beyond the edges of each of said elements for engagement with said valve discs respectively to flex said medial portions and bias said valve discs into engagement with said seating means.

4. A conduit gate valve comprising a casing having inlet and outlet passages and oppositely disposed seating means between said passages, closure means movable between open and closed positions relative to said seating means and including a pair of matching valve discs extending beyond said seating means and having ports forming a continuation of said passages in said open position, a pair of elongated guide elements carried by said casing and disposed on opposite sides of said casing intermediate said seating means, each of said elements having a pair of laterally spaced longitudinally extending slots formed in the medial portion thereof to impart flexibility thereto, each of said slots terminating in enlarged apertures formed in each said element, and a pair of bearings on opposite sides of each of said elements and disposed longitudinally thereof within said medial portion, said bearings extending laterally beyond the edges of said elements respectively for engagement with said valve discs respectively to flex said medial portions and bias said valve discs into engagement with said seating means.

5. A conduit gate valve comprising a casing having inlet and outlet passages and oppositely disposed seating means between said passages, closure means movable between open and closed positions relative to said seating means including a pair of matching valve discs extending beyond said seating means and having ports forming a continuation of said passages in said open position, a pair of elongated guide elements carried by said casing and disposed on opposite sides of said casing intermediate said seating means, each of said elements having a pair of laterally spaced longitudinally extending slots formed in the medial portion thereof to impart flexibility thereto, a pair of bearings on opposite sides of each of said elements and disposed longitudinally thereof within said medial portion, said bearings extending laterally beyond the edges of said elements respectively for engagement with said valve discs respectively to flex said medial portions and bias said valve discs into engagement with said seating means, wedging means on each of said elements located axially of said passages, and wedging means carried by each of said valve discs for cooperation with said wedging means respectively on said elements in said closed position for applying lateral forces to said valve discs for holding the same in seating engagement with said seating means.

6. A conduit gate valve comprising a casing having inlet and outlet passages and oppositely disposed seating means between said passages, a pair of elongated guide elements carried by said casing and disposed on opposite sides of said casing intermediate said seating means, each of said elements having a pair of laterally spaced longitudinally extending slots formed in a medial portion thereof to impart flexibility thereto, a pair of bearings on opposite sides of each of said elements and disposed longitudinally thereof within said medial portion, said bearings extending laterally beyond the edges of said elements respectively, wedging means carried by each of said elements and located axially of said passages, closure means movable between open and closed positions relative to said seating means and said elements and including a pair of matching valve discs extending beyond said seating means and having ports forming a continuation of said passages in said open position, wedging means carried by each of said valve discs for cooperation with said wedging means respectively on said elements in said closed position for applying lateral forces to said valve discs for holding the same in seating engagement with said seating means, and means extending longitudinally of said valve discs beyond said seating means for slidable engagement with said bearings to flex said medial portions of said elements and maintain said valve discs in yieldable engagement with said seating means in all positions of said discs.

References Cited in the file of this patent

UNITED STATES PATENTS

| | | |
|---|---|---|
| 948,405 | Webb | Feb. 8, 1910 |
| 1,063,438 | Harlan | June 2, 1913 |
| 2,230,600 | Olson | Feb. 4, 1941 |